(12) United States Patent
Wu et al.

(10) Patent No.: US 11,290,195 B2
(45) Date of Patent: Mar. 29, 2022

(54) MOBILE TERMINAL TESTING DEVICE AND MOBILE TERMINAL TESTING METHOD

(71) Applicant: ANRITSU CORPORATION, Kanagawa (JP)

(72) Inventors: Zhihui Wu, Kanagawa (JP); Takumi Nakamura, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 0 days.

(21) Appl. No.: 17/357,170

(22) Filed: Jun. 24, 2021

(65) Prior Publication Data

US 2022/0006535 A1    Jan. 6, 2022

(30) Foreign Application Priority Data

Jul. 1, 2020 (JP) .............................. JP2020-114394

(51) Int. Cl.
| | |
|---|---|
| *H04B 17/00* | (2015.01) |
| *H04B 17/15* | (2015.01) |
| *H04B 17/29* | (2015.01) |

(52) U.S. Cl.
CPC ......... *H04B 17/0085* (2013.01); *H04B 17/15* (2015.01); *H04B 17/29* (2015.01)

(58) Field of Classification Search
CPC ..... H04B 17/0085; H04B 17/15; H04B 17/29
See application file for complete search history.

(56) References Cited

U.S. PATENT DOCUMENTS

| | | | | |
|---|---|---|---|---|
| 5,528,156 | A * | 6/1996 | Ueda ..................... | G01R 31/307 850/10 |
| 5,959,458 | A * | 9/1999 | Talbot ................. | G01R 19/2509 324/754.21 |
| 7,890,830 | B1 * | 2/2011 | Wada ............... | G01R 31/31813 714/724 |
| 9,768,892 | B1 * | 9/2017 | Bradley ................. | H04B 17/17 |
| 2007/0098059 | A1 * | 5/2007 | Ives ....................... | H04B 17/15 375/224 |
| 2007/0197169 | A1 * | 8/2007 | Viss ........................ | H04L 1/242 455/67.14 |

(Continued)

OTHER PUBLICATIONS

3GPP Technical Specifications, V16.7.0 (Mar. 2021), Release 16, Chapter 38.521-2, Section 7.3.2, Reference Sensitivity Power Level.

*Primary Examiner* — Dominic E Rego
(74) *Attorney, Agent, or Firm* — Pearne & Gordon LLP

(57) ABSTRACT

In a measurement device 1, a reception sensitivity test control unit 18 includes test condition setting means 18b for setting a predetermined error tolerance level EL, throughput measurement means 18c for measuring a throughput related to reception capacity of the mobile terminal for each transmission and reception, output level setting means 18d for setting an output level of the test signal to be different from a previous output level according to a comparison result between a measurement result of the throughput and a predetermined threshold value set in advance, and measurement result output means 18e for continuing the transmission and reception in a case where a fluctuation range with respect to the previous output level exceeds the error tolerance level, and outputting a test result in a case where the fluctuation range with respect to the previous output level is in a range of the error tolerance level.

7 Claims, 12 Drawing Sheets

(56) References Cited

U.S. PATENT DOCUMENTS

| | | | | |
|---|---|---|---|---|
| 2009/0027135 | A1* | 1/2009 | Kurosawa | G06F 1/0342 332/100 |
| 2009/0204357 | A1* | 8/2009 | Kurosawa | G06F 1/0342 702/124 |
| 2012/0176143 | A1* | 7/2012 | Kawabata | G01R 19/2509 341/122 |
| 2012/0231744 | A1* | 9/2012 | Gregg | H04B 17/309 455/67.12 |
| 2012/0231745 | A1* | 9/2012 | Gregg | H04B 17/29 455/67.11 |
| 2016/0156408 | A1* | 6/2016 | Arcidiacono | H04B 7/18519 455/12.1 |
| 2019/0025372 | A1* | 1/2019 | Waelchli | G11C 29/56016 |
| 2019/0369158 | A1* | 12/2019 | Murao | H03F 3/193 |
| 2020/0025799 | A1* | 1/2020 | Vedagarbha | G01R 31/26 |
| 2020/0228434 | A1* | 7/2020 | Olgaard | H04B 17/318 |
| 2021/0132141 | A1* | 5/2021 | Teyssier | H04B 17/0085 |

* cited by examiner

| Number of measurements | OL(n) (dB) | Through-put | SL(n)(dB) (OL(n) − OL(n−1)) | Process of next output level | Next output level |
|---|---|---|---|---|---|
| 1 | −60 | PASS | −20 (=SL0) | Level Down A | OL(2) = OL(1) − \|SL(1)\| |
| 2 | −80 | PASS | −20 | Level Down A | OL(3) = DT ( DT = −90 ) |
| 3 | −90 | FAIL | −10 | Level Up B | OL(4) = OL(3) + 1/2 · \|SL(3)\| |
| 4 | −85 | PASS | +5 | Level Down B | OL(5) = OL(4) − 1/2 · \|SL(4)\| |
| 5 | −87.5 | PASS | −2.5 | Level Down B | OL(6) = OL(5) − 1/2 · \|SL(5)\| |
| 6 | −88.7 | FAIL | −1.2 | Level Up B | OL(7) = OL(6) + 1/2 · \|SL(6)\| |
| 7 | −88.1 | FAIL | +0.6 | End measurement since SL(7) < EL(=1.0) | |

FIG. 10

MOBILE TERMINAL TESTING DEVICE AND MOBILE TERMINAL TESTING METHOD

TECHNICAL FIELD

The present invention relates to a mobile terminal testing device and a mobile terminal testing method for performing a reception sensitivity test of receiving a test signal by a device under test and measuring reception sensitivity a plurality of times, and testing a mobile terminal which is the device under test.

BACKGROUND ART

For a wireless terminal that has been developed in recent years and transmits and receives a radio signal corresponding to IEEE802.11ad, 5G cellular, and the like, in which a signal in a wide band of a millimeter wave band is used, a performance test is performed of measuring an output level and reception sensitivity of a transmitted radio wave determined for each communication standard with respect to a wireless communication antenna included in the wireless terminal, and determining whether or not a predetermined reference is satisfied.

For example, in a performance test in which a wireless terminal for a 5G new radio (NR) system (hereinafter, referred to as a 5G wireless terminal) is used as a device under test (DUT), an OTA test is performed using a radio anechoic box (OTA chamber) called a compact antenna test range (CATR) which is not affected by a surrounding radio wave environment.

For various tests, such as OTA tests, targeting 5G wireless terminals, for example, tests are obliged to be performed according to standards disclosed in Non-Patent Document 1.

For example, regarding a DUT reception sensitivity test for aggregating measurement results by executing an operation of receiving a test signal transmitted from a signal generator by the DUT (5G wireless terminal) and measuring reception sensitivity a plurality of times, a Section 7.3.2 of Chapter 38.521-2 of non-patent document 1 discloses provisions such as a minimum allowable output level [dB] of the test signal.

RELATED ART DOCUMENT

Non-Patent Document

[Non-Patent Document 1] 3GPP Technical Specifications, Chapter 38.521-2, 7.3.2

DISCLOSURE OF THE INVENTION

Problem that the Invention is to Solve

A mobile terminal testing device according to the related art, which obtains a measurement result of reception sensitivity by executing an operation of receiving a test signal by a DUT and measuring the reception sensitivity a plurality of times, generally adopts a method (refer to a characteristic C2 in FIG. 11) for performing gradual change (linear change) by a constant level as the number of measurements increases from an output level set in an initial reception sensitivity test in order to maintain the output level of the test signal as a value according to a standard described in Non-Patent Document 1.

Therefore, in the mobile terminal testing device according to the related art, a long time is taken to control the output level of the test signal transmitted from a signal generator to an output level (testable level) suitable for the reception sensitivity test of the mobile terminal, so that, as a result, there is a problem in that a test time of the reception sensitivity test becomes long.

The present invention has been made to solve the problems according to the related art, and an object of the present invention is to provide a mobile terminal testing device and a mobile terminal testing method that can set an output level of a test signal to a testable level in a short time and can efficiently perform a reception sensitivity test of the mobile terminal.

Means for Solving the Problem

In order to solve the above problems, according to the present invention, there is provided a mobile terminal testing device for testing a mobile terminal (100) which is a device under test including a signal generator (20) that generates a test signal; and reception sensitivity test execution means (18) for executing a test of calculating reception sensitivity by repeating transmission and reception of the test signal from the signal generator to a device under test, in which the reception sensitivity test execution means includes test condition setting means (18b) for setting a predetermined error tolerance level (EL), throughput measurement means (18c) for measuring a throughput related to reception capacity of the mobile terminal for each transmission and reception, output level setting means (18d) for setting an output level of the test signal to be different from a previous output level according to a comparison result between a measurement result of the throughput and a predetermined threshold value set in advance, and measurement result output means (18e) for continuing the transmission and reception in a case where a fluctuation range with respect to the previous output level exceeds the error tolerance level, and outputting a test result in a case where the fluctuation range with respect to the previous output level is in a range of the error tolerance level.

With the configuration, in the mobile terminal testing device according to the present invention, the output level of the test signal is set to be different from the previous output level according to the measurement result of the throughput, so that it is possible to significantly reduce the number of executions of the transmission and reception compared to a case where the output level of the test signal is linearly changed, it is possible to set the output level of the test signal to a target level in a short time, and it is possible to efficiently execute a reception sensitivity test of the mobile terminal.

Further, in the mobile terminal testing device according to the present invention, in a case where the comparison result between the measurement result of the throughput and the predetermined threshold value set in advance becomes out of a permissible range for the first time, the output level setting means sets the output level to a higher value than the previous output level by performing a level up process, so that the fluctuation range with respect to the previous output level is smaller than a value of any of fluctuation ranges of the output level in a case where the measurement result of the throughput is in a permissible range.

With the configuration, the mobile terminal testing device according to the present invention performs a level up process on the output level in a case where a value of the throughput is determined to be out of the permissible range, and, thereafter, performs control so that the fluctuation range of the output level becomes smaller, so that it is possible to more efficiently reduce the time for the reception sensitivity test of the mobile terminal.

Further, in the mobile terminal testing device according to the present invention, in a case where the comparison result between the measurement result of the throughput and the predetermined threshold value set in advance becomes in the permissible range again, the output level setting means may reduce the output level by a level down process, so that the fluctuation range with respect to the previous output level is smaller than a value of the fluctuation range in a case where the comparison result between the measurement result of the throughput and the predetermined threshold value set in advance is out of the permissible range.

With the configuration, the mobile terminal testing device according to the present invention performs a level down process on the output level in a case where the value of the throughput is determined to be in the permissible range, and, thereafter, performs control so that the fluctuation range of the output level becomes smaller, so that it is possible to more efficiently reduce the time for the reception sensitivity test of the mobile terminal.

Further, the mobile terminal testing device according to the present invention may further include a radio anechoic box (50) including an internal space (51); and scanning means (16, 56) for driving and scanning the mobile terminal so as to continuously change an orientation of the mobile terminal in the internal space, in which the reception sensitivity test may be performed in all orientations to be scanned by the scanning means in an over the air (OTA) measurement environment in the internal space.

With the configuration, in the mobile terminal testing device according to the present invention, it is possible to significantly reduce the time for the reception sensitivity test even under a situation in which reception sensitivity measurement should be performed for all orientations under an OTA environment.

Further, in order to solve the above problems, according to the present invention, there is provided a mobile terminal testing method for testing a mobile terminal (100) which is a device under test by executing a test of calculating reception sensitivity by repeating transmission and reception of a test signal from a signal generator (20) to the device under test, the mobile terminal testing method including a test condition setting step (S1) of setting a predetermined error tolerance level (EL); a throughput measurement step (S4) of measuring a throughput related to reception capacity of the mobile terminal for each transmission and reception; an output level setting step (S7, S10, S12) of setting an output level of the test signal to be different from a previous output level according to a comparison result between a measurement result of the throughput and a predetermined threshold value set in advance; a test continuation step (S6, S7) of continuing the transmission and reception in a case where a fluctuation range with respect to the previous output level exceeds the error tolerance level set by the test condition setting step; and a measurement result output step (S6, S15) of outputting a test result in a case where the fluctuation range of the output level with respect to the previous output level is in a range of the error tolerance level.

With the configuration, in the mobile terminal testing method according to the present invention, the output level of the test signal is set to be different from the previous output level according to the measurement result of the throughput, so that it is possible to significantly reduce the number of executions of the transmission and reception compared to a case where the output level of the test signal is linearly changed, it is possible to set the output level of the test signal to a target level in a short time, and it is possible to efficiently execute a reception sensitivity test of the mobile terminal.

Advantage of the Invention

The present invention can provide a mobile terminal testing device and a mobile terminal testing method that can set an output level of a test signal to a testable level in a short time and can efficiently perform a reception sensitivity test of the mobile terminal.

BRIEF DESCRIPTION OF THE DRAWINGS

FIGS. 5A and 5B are diagrams showing total spherical scanning images of a device under test in an OTA chamber of the measurement device according to the embodiment of the present invention, in which FIG. 5A shows a disposition mode of the device under test with respect to a center of a spherical coordinate system, and FIG. 5B shows a distribution mode of angular sample points PS in the spherical coordinate system.

FIG. 8A shows a level down process (A), and FIG. 8B shows a level down process (B).

FIG. 9A shows a level up process (A), and FIG. 9B shows a level up process (B).

FIG. 10 is a chart showing a data example of a parameter related to an output level of a variable test signal set according to the number of measurements by the variable setting control of the output level shown in FIG. 7.

BEST MODE FOR CARRYING OUT THE INVENTION

Hereinafter, an embodiment of a mobile terminal testing device and a mobile terminal testing method according to the present invention will be described with reference to the accompanying drawings.

Figure 1:
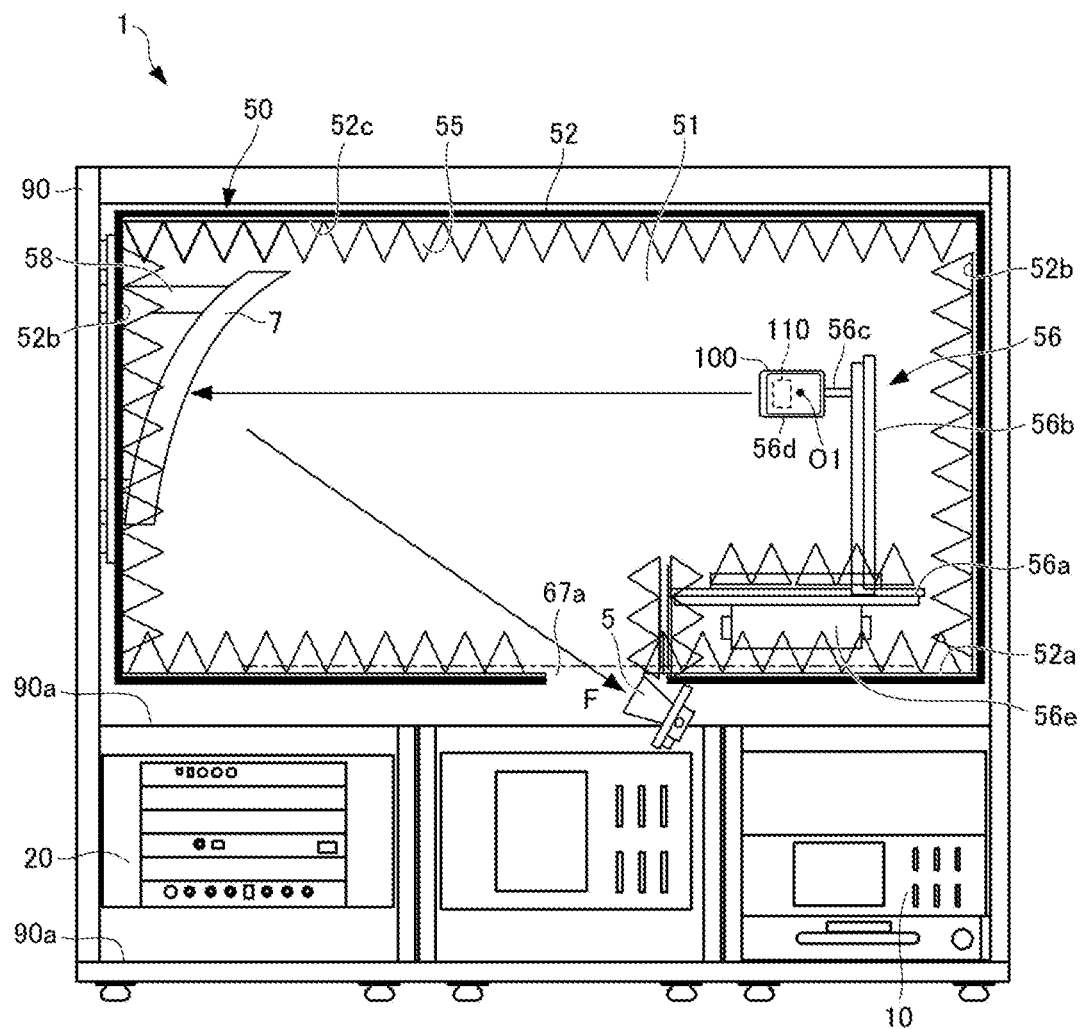
FIG. 1 is a diagram showing a schematic configuration of an entire measurement device according to an embodiment of the present invention.
Figure 2:
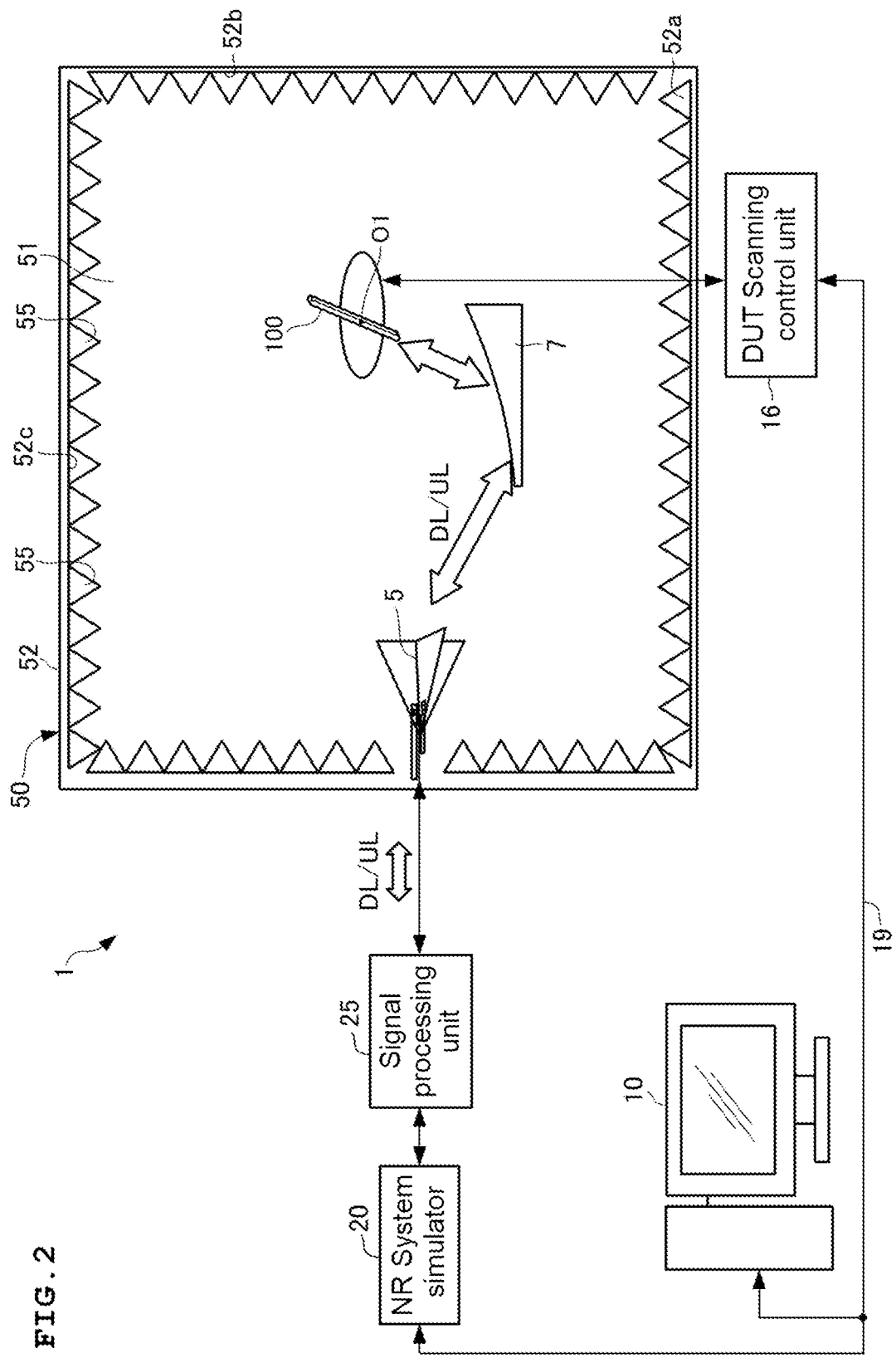
FIG. 2 is a block diagram showing a functional configuration of the measurement device according to the embodiment of the present invention.

First, a configuration of a measurement device 1 according to the embodiment of the present invention will be described with reference to FIGS. 1 to 4. The measurement device 1 constitutes the mobile terminal testing device of the present invention. The measurement device 1 according to the present embodiment has an external structure as shown in FIG. 1 as a whole, and includes functional blocks as shown in FIG. 2. FIGS. 1 and 2 show a disposition mode of each component of an OTA chamber 50 in a state of being seen through from a side surface thereof.

The measurement device 1 is operated, for example, in a mode in which each of the above-described components is mounted on each rack 90a of a rack structure 90 having the structure shown in FIG. 1. FIG. 1 shows an example in which each of an integrated control device 10, an NR system simulator 20, and an OTA chamber 50 is mounted on each rack 90a of the rack structure 90.

As shown in FIG. 2, the measurement device 1 according to the present embodiment includes the integrated control device 10, the NR system simulator 20, a signal processing unit 25, and the OTA chamber 50.

For the configuration, here, the OTA chamber 50 will be described first for convenience. As shown in FIGS. 1 and 2, the OTA chamber 50 includes, for example, a metal housing main body 52 having a rectangular internal space 51, and accommodates a DUT 100 having an antenna 110, a test antenna 5, a reflector 7, and a DUT scanning mechanism 56 in the internal space 51.

A radio wave absorber 55 is attached to a whole area of an inner surface of the OTA chamber 50, that is, a bottom surface 52a, a side surface 52b, and a top surface 52c of the housing main body 52. As a result, in the OTA chamber 50, each element (the DUT 100, the test antenna 5, the reflector 7, and the DUT scanning mechanism 56) disposed in the internal space 51 has an enhanced function of regulating intrusion of radio waves from the outside and radiation of the radio waves to the outside. In this way, the OTA chamber 50 realizes a radio anechoic box having the internal space 51 that is not affected by a surrounding radio wave environment. The radio anechoic box used in the present embodiment is, for example, an Anechoic type.

Among those accommodated in the internal space 51 of the OTA chamber 50, the DUT 100 is, for example, a wireless terminal such as a smartphone. Communication standards for the DUT 100 include cellular (LTE, LTE-A, W-CDMA (registered trademark), GSM (registered trademark), CDMA 2000, 1xEV-DO, TD-SCDMA, or the like), wireless LAN (IEEE 802.11b/g/a/n /ac/ad, or the like), Bluetooth (registered trademark), GNSS (GPS, Galileo, GLONASS, BeiDou, or the like), FM, and digital broadcasting (DVB-H, ISDB-T, or the like). Further, the DUT 100 may be a wireless terminal that transmits and receives a radio signal in a millimeter wave band corresponding to IEEE 802.11ad, 5G cellular, or the like.

In the present embodiment, the antenna 110 of the DUT 100 uses a radio signal in each regulated frequency band in conformity with, for example, LTE or 5G NR communication standard. The DUT 100 constitutes the device under test, that is, a mobile terminal in the present invention.

In the internal space 51 of the OTA chamber 50, the DUT 100 is held by a part of mechanism of the DUT scanning mechanism 56. The DUT scanning mechanism 56 is provided to extend in a vertical direction on the bottom surface 52a of the housing main body 52 in the internal space 51 of the OTA chamber 50. The DUT scanning mechanism 56 performs a total spherical scanning (refer to FIGS. 5A and 5B and FIG. 6), which will be described later, on the DUT 100 while holding the DUT 100 on which a performance test is performed.

As shown in FIG. 1, the DUT scanning mechanism 56 includes a turntable 56a, a support column member 56b, a DUT mounting portion 56c, and a drive unit 56e. The turntable 56a includes a plate member having a disk shape, and has a configuration (refer to FIG. 3) that rotates around an azimuth axis (a rotation axis in the vertical direction). The support column member 56b includes a columnar member disposed to extend in a direction perpendicular to a plate surface of the turntable 56a.

The DUT mounting portion 56c is disposed near an upper end of the support column member 56b to be in parallel with the turntable 56a, and has a mounting tray 56d on which the DUT 100 is mounted. The DUT mounting portion 56c has a configuration (refer to FIG. 3) capable of rotating around the roll axis (a rotation axis in a horizontal direction).

Figure 3:
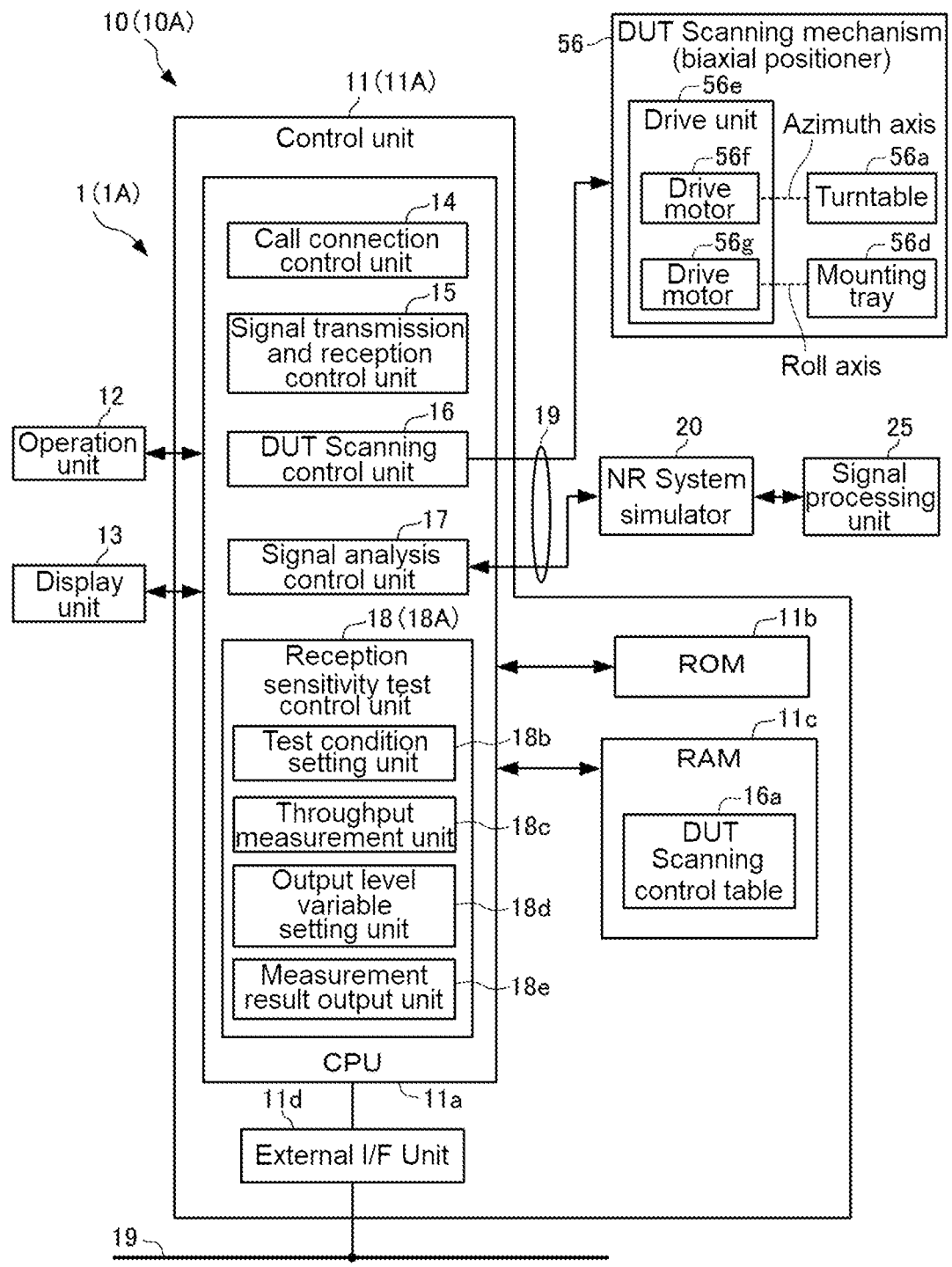
FIG. 3 is a block diagram showing functional configurations of an integrated control device of the measurement device and a controlled element thereof according to the embodiment of the present invention.
Figure 4:
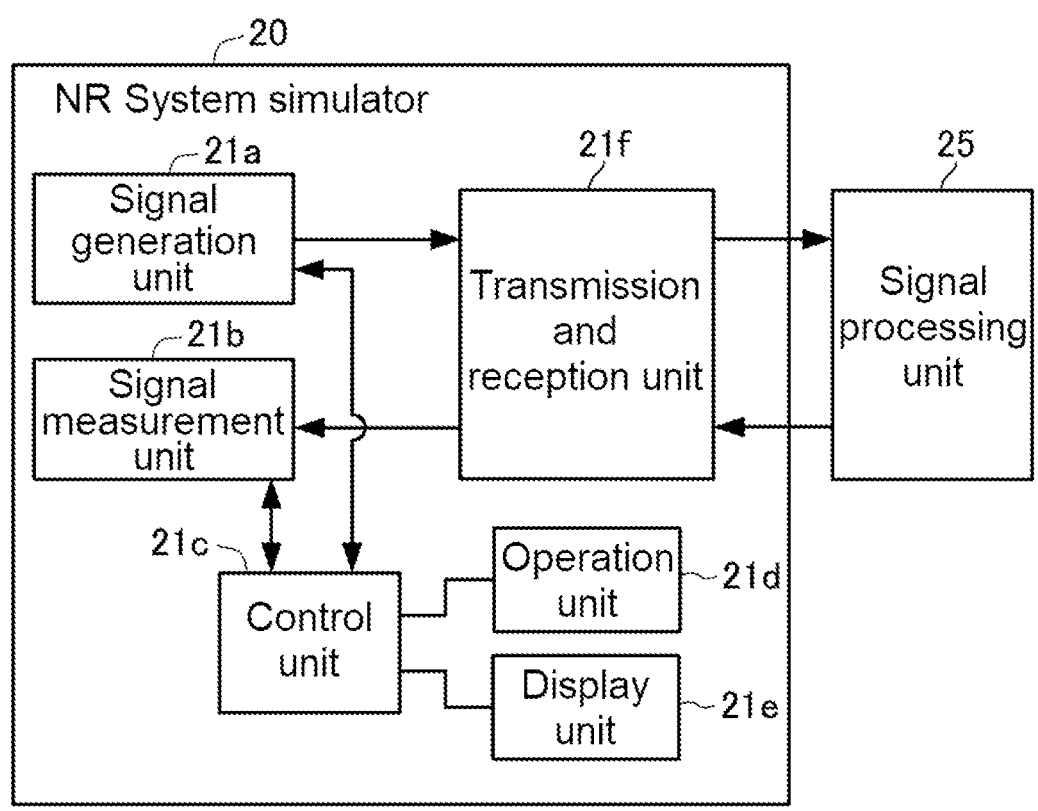
FIG. 4 is a block diagram showing a functional configuration of an NR system simulator in the measurement device according to the embodiment of the present invention.

As shown in FIG. 3, the drive unit 56e includes, for example, a drive motor 56f that rotationally drives the azimuth axis, and a drive motor 56g that rotationally drives the roll axis. The drive unit 56e includes a biaxial positioner provided with a mechanism for rotating the azimuth axis and the roll axis in respective rotation direction thereof by the drive motor 56f and the drive motor 56g. In this way, the drive unit 56e can rotate the DUT 100 mounted on the mounting tray 56d in biaxial (the azimuth axis and the roll axis) directions for each mounting tray 56d. Hereinafter, there is a case where the entire DUT scanning mechanism 56 including the drive unit 56e is referred to as the biaxial positioner (refer to FIG. 3). Each of the drive unit 56e and the drive motors 56f and 56g constitutes drive means, first rotary drive means, and second rotary drive means in the present invention. The mounting tray 56d constitutes the device under test mounting portion in the present invention.

Figure 5A:
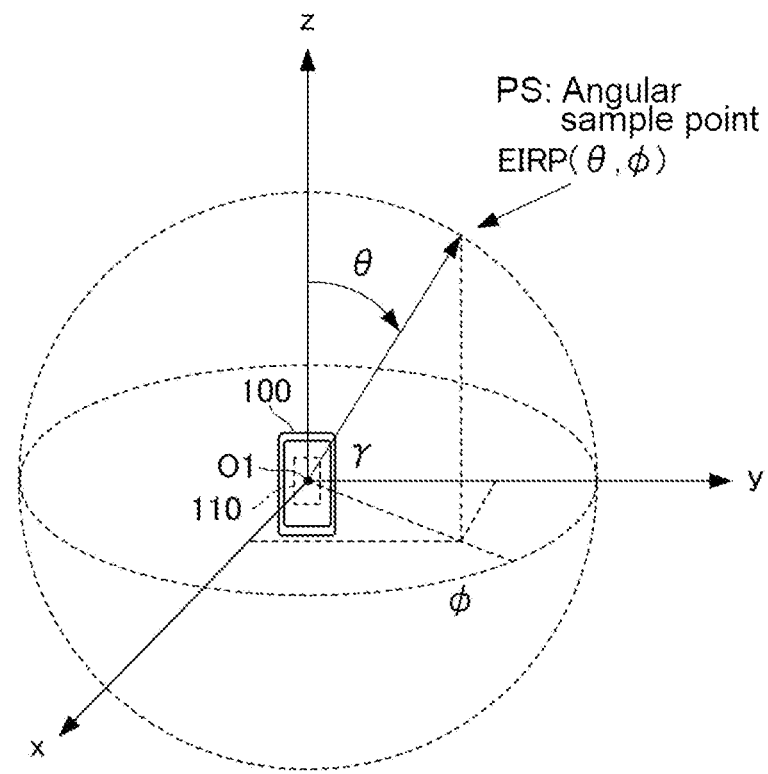
Figure 5B:
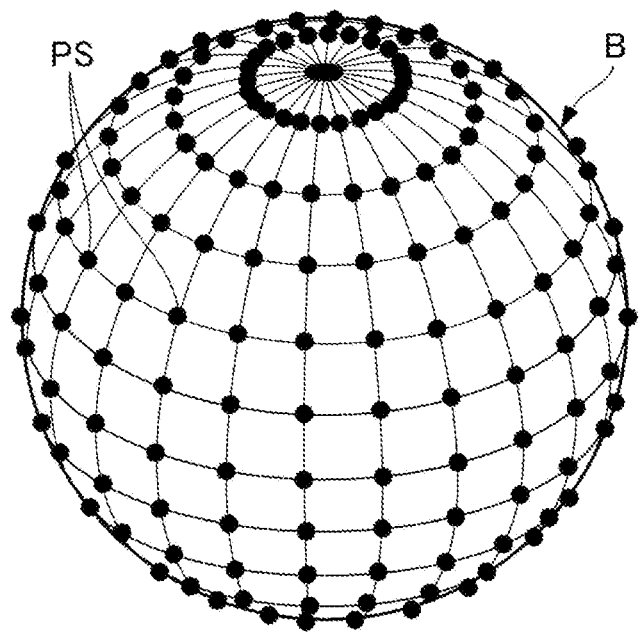

The DUT scanning mechanism 56 performs total spherical scanning which sequentially changes a posture of the DUT 100 to a state in which the antenna 110 faces all orientations of a surface of the sphere while assuming that the DUT 100 mounted (held) on the mounting tray 56d is disposed, for example, at a center O1 of the sphere (refer to a sphere B in FIGS. 5A and 5B). Control of the DUT scanning in the DUT scanning mechanism 56 is performed by a DUT scanning control unit 16 which will be described later. The DUT scanning mechanism 56 and the DUT scanning control unit 16 constitute scanning means in the present invention.

The test antenna 5 is attached to a required position on the bottom surface 52a of the housing main body 52 of the OTA chamber 50 by using an appropriate holder (not shown). An attachment position of the test antenna 5 is a position at which visibility can be secured from the reflector 7 via an opening 67a provided on the bottom surface 52a. The test antenna 5 uses a radio signal in the frequency band of the same regulation (NR standard) as the antenna 110 of the DUT 100.

In a case where measurement related to the NR of the DUT 100 is performed in the OTA chamber 50, the test antenna 5 transmits a test signal from the NR system simulator 20 to the DUT 100 and receives a signal under measurement transmitted from the DUT 100 that has received the test signal. The test antenna 5 is disposed so that a light reception surface thereof becomes a focal position F of the reflector 7. The reflector 7 is not always required in a case where the test antenna 5 can be disposed so that the light reception surface thereof faces the DUT 100 and appropriate light reception can be performed.

The reflector 7 is attached to a required position on the side surface 52b of the OTA chamber 50 by using a reflector holder 58. The reflector 7 realizes a radio wave path that returns the radio signal (the test signal and the signal under measurement) transmitted and received by the antenna 110 of the DUT 100 to the light reception surface of the test antenna 5.

Subsequently, configurations of the integrated control device 10 and the NR system simulator 20 will be described. As shown in FIG. 2, the integrated control device 10 is communicably connected to the NR system simulator 20 via a network 19 such as Ethernet (registered trademark). Further, the integrated control device 10 is also connected to a controlled system element in the OTA chamber 50, for example, the DUT scanning control unit 16 via the network 19.

The integrated control device 10 comprehensively controls the NR system simulator 20 and the DUT scanning control unit 16 via the network 19, and includes, for example, a Personal Computer (PC). The DUT scanning control unit 16 may be independently provided accompanying with the OTA chamber 50 (refer to FIG. 2), or may be provided in the integrated control device 10 as shown in FIG. 3. Hereinafter, description will be performed while assuming that the integrated control device 10 has the configuration shown in FIG. 3.

As shown in FIG. 3, the integrated control device 10 includes a control unit 11, an operation unit 12, and a display unit 13. The control unit 11 includes, for example, a computer device. The computer device includes a Central Processing Unit (CPU) 11a that performs predetermined information processing to realize the function of the measurement device 1, and performs comprehensive control on the NR system simulator 20 as targets, a Read Only Memory (ROM) 11b that stores an Operating System (OS) for starting up the CPU 11a, the other programs, and control parameters, and the like, a Random Access Memory (RAM) 11c that stores execution code, data, and the like of the OS or an application which is used for an operation by the CPU 11a, an external I/F unit 11d, an input and output port (not shown), and the like.

The external I/F unit 11d is communicably connected to each of the NR system simulator 20 and the drive unit 56e of the DUT scanning mechanism (biaxial positioner) 56 via the network 19. An operation unit 12 and a display unit 13 are connected to the input and output port. The operation unit 12 is a functional unit for inputting various information such as commands, and the display unit 13 is a functional unit for displaying various information such as an input screen, measurement results, and the like of the various information.

The computer device described above functions as the control unit 11 in such a way that the CPU 11a executes a program stored in the ROM 11b while using the RAM 11c as a work area. As shown in FIG. 3, the control unit 11 includes a call connection control unit 14, a signal transmission and reception control unit 15, a DUT scanning control unit 16, a signal analysis control unit 17, a reception sensitivity test control unit 18. The call connection control unit 14, the signal transmission and reception control unit 15, the DUT scanning control unit 16, the signal analysis control unit 17, and the reception sensitivity test control unit 18 are also realized by executing a predetermined program stored in the ROM 11b in the work area of the RAM 11c by the CPU 11a.

The call connection control unit 14 drives the test antenna 5 via the NR system simulator 20 and the signal processing unit 25 to transmit and receive a control signal (radio signal) to and from the DUT 100, thereby performing control to establish a call (a state in which the radio signal can be transmitted and received) between the NR system simulator 20 and the DUT 100.

The signal transmission and reception control unit 15 performs a control of monitoring a user operation in the operation unit 12, transmitting a signal transmission command to the NR system simulator 20 after the call is established through call connection control, by being triggered with a predetermined measurement start operation related to the measurement of transmission and reception characteristics of the DUT 100 by the user, and transmitting the test signal from the NR system simulator 20 via the test antenna 5, and a control of transmitting a signal reception command and receiving the signal under measurement via the test antenna 5.

The DUT scanning control unit 16 drives and controls the drive motors 56f and 56g of the DUT scanning mechanism to perform total spherical scanning of the DUT 100 mounted on the mounting tray 56d of the DUT mounting portion 56c. In order to realize the control, for example, a DUT scanning control table 16a is prepared in the ROM 11b in advance. The DUT scanning control table 16a stores, for example, coordinates of each angular sample point PS (refer to FIG. 5B) in the spherical coordinate system (refer to FIG. 5A) related to the total spherical scanning of the DUT 100, drive data of the drive motors 56f and 56g associated with the coordinates of each angular sample point PS, and control data associated with a stop time (measurement time) at each angular sample point PS. In a case where the drive motors 56f and 56g are, for example, stepping motors, for example, the number of drive pulses is stored as the drive data.

The DUT scanning control unit 16 expands the DUT scanning control table 16a into the work area of the RAM 11c, and drives and controls the drive motors 56f and 56g of the DUT scanning mechanism 56 based on the control data stored in the DUT scanning control table 16a. As a result, the total spherical scanning of the DUT 100 mounted on the DUT mounting portion 56c is performed. In the total spherical scanning, the antenna surface of the antenna 110 of the DUT 100 is stopped for a regulated time (the stop time) toward the angular sample point PS for each angular sample point PS in the spherical coordinate system, and, thereafter, an operation of moving to a next angular sample point PS (scanning of the DUT 100) is sequentially performed while targeting all the angular sample points PS.

In a case where the total spherical scanning of the DUT 100 is performed, the signal analysis control unit 17 captures each of the radio signals related to NR and LTE and received by the test antenna 5 and the LTE test antennas 6a and 6b via the NR system simulator 20, and performs an analysis process (measurement process) on the radio signal as a signal of a designated measurement item.

The reception sensitivity test control unit 18 executes a reception sensitivity test of receiving the test signal, which is transmitted from the signal generation unit 21a of the NR system simulator 20, by the DUT 100 and measuring the reception sensitivity a plurality of times, and performs control to aggregate measurement results of the reception sensitivity test, which is executed the plurality of times, as test results. The reception sensitivity test control unit 18 constitutes reception sensitivity test execution means of the present invention.

As shown in FIG. 3, the reception sensitivity test control unit 18 includes a test condition setting unit 18b, a throughput measurement unit 18c, an output level variable setting unit 18d, and a measurement result output unit 18e. The test condition setting unit 18b, the throughput measurement unit 18c, the output level variable setting unit 18d, and the measurement result output unit 18e constitute test condition setting means, throughput measurement means, output level setting means, and measurement result output means of the present invention, respectively.

The test condition setting unit 18b is a functional unit that sets a test condition of the reception sensitivity test. The test condition set by the test condition setting unit 18b includes an initial step level SLO, a starting output level OLO, an error tolerance level (error tolerance of boundary level) EL, and a connection drop determination threshold value (connection drop threshold) DT, and the like. The initial step level SLO indicates an initial value of a step fluctuation range of an output level of the test signal which is changed stepwise in a case of the reception sensitivity test. The starting output level OLO indicates an output level of the DUT 100 (an output level in a case of first transmission and reception) in a case of starting the reception sensitivity test. The error tolerance level EL indicates an output level of a predetermined test signal for determining whether or not to continue the reception sensitivity test on a next output level. The connection drop determination threshold value DT is a set value of a bottom value which causes drop of call connection (call drop) in case where a value is lower than the connection drop determination threshold value. In an algorithm shown in FIG. 7, the output level is lowered by a large step. Therefore, in a case where the process proceeds any further, call drop occurs, so that a threshold value which does not lower the output level is necessary. The value can be preset by the user.

The throughput measurement unit 18c is a functional unit that measures a throughput related to reception capacity of the DUT 100 for each reception sensitivity test. For example, a configuration may be provided in which the throughput measurement unit 18c transmits a transmission rate to the DUT 100 in accordance with the transmission of the test signal, and, thereafter, the DUT 100 measures the throughput from the received transmission rate in accordance that a reception result (received transmission rate) of the test signal is notified to the NR system simulator 20.

The output level variable setting unit 18d functional unit that performs variable setting, according to a comparison result between a measurement result of the throughput by the throughput measurement unit 18c and a predetermined threshold value (throughput threshold value) set in advance, so that the output level of the test signal in the next reception sensitivity test is in an ascending or descending direction, that is, the output levels of the test signals between the reception sensitivity tests corresponding to before and after number of times become different.

The measurement result output unit 18e is a functional unit that proceeds to the next reception sensitivity test (throughput measurement) in a case where a test result fluctuation range between a test result (throughput measurement result) of a current reception sensitivity test using the test signal, which has an output level after the variable setting, and a test result of a previous reception sensitivity test exceeds a range of a fluctuation range (EL) set by the test condition setting unit 18b, and outputs the test result in a case where the test result fluctuation range is in the fluctuation range (EL).

As shown in FIG. 4A, the NR system simulator 20 includes a signal generation unit 21a, a transmission and reception unit 21f, a signal measurement unit 21b, a control unit 21c, an operation unit 21d, and a display unit 21e. The NR system simulator 20 constitutes the signal generator of the present invention.

The signal generation unit 21a generates a signal (baseband signal) that becomes a source of the test signal. The transmission and reception unit 21f functions as an RF unit that generates the test signal corresponding to a frequency of each communication standard from the signal generated by the signal generation unit 21a and sends the generated test signal to the signal processing unit 25, and restores the baseband signal from the signal under measurement which is sent from the signal processing unit 25. The signal measurement unit 21b performs measurement process of the signal under measurement based on the baseband signal restored by the transmission and reception unit 21f.

A control unit 21c comprehensively controls each of the functional units including the signal generation unit 21a, the signal measurement unit 21b, the operation unit 21d, and the display unit 21e. The operation unit 21d is a functional unit for inputting various information such as commands, and the display unit 21e is a functional unit for displaying various information such as an input screen of the various information and measurement results.

In the measurement device 1 having the above-described configuration, the DUT 100 is mounted on the mounting tray 56d of the DUT scanning mechanism 56 (biaxial positioner) in the internal space 51 of the OTA chamber 50, and it is possible to measure the measurement item, such as EIRP-CDF, EIS-CDF, or TRP, related to the radio signal of the DUT 100 while rotating the DUT 100 in biaxial (azimuth axis and roll axis) directions (while changing an angle of the positioner) for each mounting tray 56d.

Here, control (total spherical scanning) of an angle of the DUT 100 by changing the angle of the biaxial positioner, which is required in a case of measuring each of the measurement items described above, will be described with reference to FIGS. 5A and 5B and FIG. 6.

Generally, related to measurement of radiated power targeting the DUT 100, a method for measuring equivalent isotropic radiated power (EIRP) and a method for measuring total radiated power (TRP) are known. The EIRP is, for example, a power value measured at each measurement point $(\theta, \varphi)$ in a spherical coordinate system $(r, \theta, \varphi)$ shown in FIG. 5A. On the other hand, the TRP is obtained by measuring the EIRP in all orientations of the spherical coordinate system $(r, \theta, \varphi)$, that is, at a plurality of angular sample points PS (refer to FIG. 5B), which are regulated in advance, on a spherical surface equidistant from a center O1 (hereinafter, a reference point) of the total spherical scanning of the DUT 100, and obtaining a total sum thereof.

In the present embodiment, the number of divisions $N\theta$ and $N\varphi$ for calculating the total radiated power (TRP) are set to, for example, 12, respectively. As a result, in the present embodiment, the number of angular samples (N) is obtained as N=132 (=(12−1)×12). 132 angular sample points PS obtained as above are located as shown in FIG. 5B when represented on a surface of the sphere B.

In the measurement device 1 according to the present embodiment, as shown in FIG. 5B, the EIRP is measured at positions of 132 points equidistant from the reference point of the spherical coordinate system (r, θ, φ), and, further, the EIRP is added at positions of all the point. Further, based on a result of addition of each EIRP, that is, a total sum of the EIRP at all the angular sample points PS of 132 points, the total radiated power (TRP) of the DUT 100 is obtained.

In a case where TRP measurement is performed, the integrated control device 10 drives and controls the DUT scanning mechanism 56 to perform the total spherical scanning of the DUT 100. In the total spherical scanning of the DUT 100, the integrated control device 10 rotationally drives the turntable 56a around the azimuth axis while repeatedly driving/non-driving the drive motor 56f, and rotationally drives the mounting tray 56d around the roll axis while repeatedly driving/non-driving the drive motor 56g. At that time, the integrated control device 10 performs control so that the drive motor 56f and the drive motor 56g are non-driven at each timing in which the antenna surface of the antenna 110 faces one angular sample point PS. By controlling the total spherical scanning of the DUT 100, the DUT 100 mounted on the mounting tray 56d is rotationally driven around the reference point so that the antenna surface of the antenna 110 sequentially faces (orients) all the angular sample points PS of the sphere B while the antenna 110 is held at a position of the reference point which is the center of the sphere B that regulates the spherical coordinate system (r, θ, φ).

Figure 6:
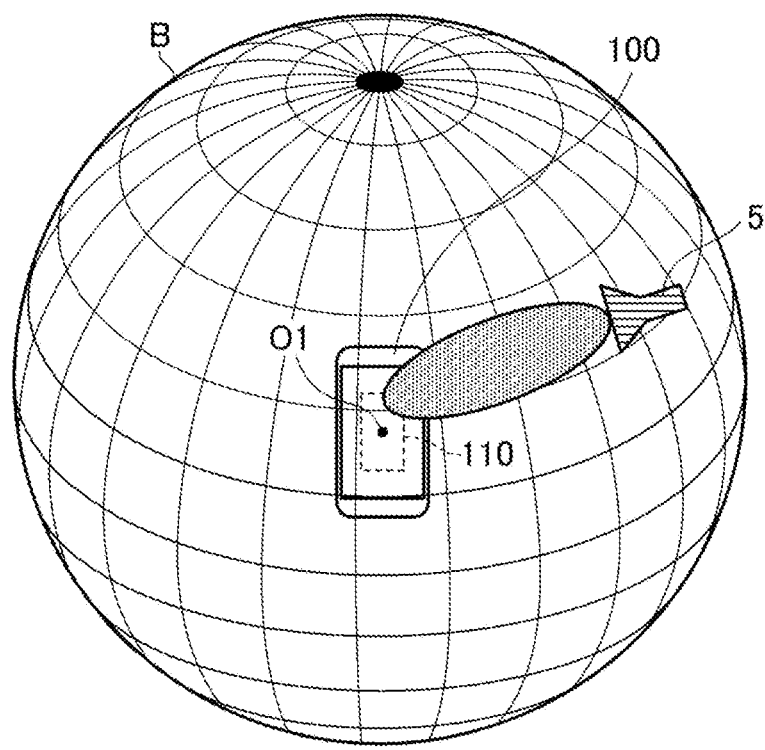
FIG. 6 is a diagram explaining a disposition mode of a test antenna 5 in the OTA chamber of the measurement device according to the embodiment of the present invention using the spherical coordinate system (r, θ, φ) shown in FIGS. 5A and 5B.

As shown in FIG. 6, the test antenna 5 is disposed at a position of a specific angular sample point PS (one point) in the spherical coordinate system (r, θ, φ). In the above-described total spherical scanning, the DUT 100 is driven (scanned) so that the antenna surface of the antenna 110 sequentially faces the light reception surface of the test antenna 5. As a result, the test antenna 5 can transmit and receive a signal for the TRP measurement to and from the antenna 110 of the DUT 100 on which the total spherical scanning is performed. Here, the transmitted and received signal is a test signal that is transmitted from the NR system simulator 20 via the test antenna 5, and a signal that is transmitted by the DUT 100, which has received the test signal, using the antenna 110, that is, a signal under measurement that is received via the test antenna 5.

In the integrated control device 10, in accordance that the DUT 100 is scanned so as to pass through each angular sample point PS in a φ direction while maintaining a certain angle of θ in the spherical coordinate system (r, θ, φ) shown in FIG. 5B, the NR system simulator 20 is driven to generate the test signal by the signal generation unit 21a and the transmission and reception unit 21f, and the test signal is transmitted from the test antenna 5 via the signal processing unit 25. Here, in a case where the DUT 100 receives the test signal at the antenna 110, the DUT 100 sends out a response signal corresponding to the reception of the test signal.

The integrated control device 10 further drives the NR system simulator 20 so that a signal, which is transmitted by the DUT 100 in response to the reception of the test signal and is received by the test antenna 5, is received by the signal measurement unit 21b as the signal under measurement from the signal processing unit 25 via the transmission and reception unit 21f. Further, the integrated control device 10 drives and controls the signal measurement unit 21b so as to perform signal processing related to the measurement of the EIRP based on the received signal under measurement. In a case where the measurement control of the EIRP is performed in accordance with the total spherical scanning of the DUT 100 which passes through all the angular sample points PS by changing the angle of θ, it is possible to measure the EIRP for all the angular sample points PS of the spherical coordinate system (r, θ, φ) to correspond to NR in the NR system simulator 20. Further, the integrated control device 10 can obtain the TRP which is the total sum of the EIRP measurement values for all the angular sample points PS.

Further, the integrated control device 10 has an output level control function (recognizing the output level of the test signal which can be normally received) of adjusting the output level (power level) of the test signal in the NR system simulator 20 to an appropriate level regulated by, for example, the 3GPP standard before performing the reception sensitivity test of the DUT 100 (measurement of measurement items such as EIRP-CDF, EIS-CDF, and TRP), which is performed while changing an angle of the biaxial positioner (DUT scanning mechanism 56) in the OTA chamber 50. The output level control function is realized by the test condition setting unit 18b, the throughput measurement unit 18c, the output level variable setting unit 18d, and the measurement result output unit 18e (refer to FIG. 3) constituting the reception sensitivity test control unit 18 provided in the control unit 11 of the integrated control device 10.

Based on the point, hereinafter, a variable setting control operation of the output level of the test signal related to the reception sensitivity test of the DUT 100 by the integrated control device 10 of the measurement device 1 according to the present embodiment will be described with reference to a flowchart shown in FIG. 7.

In a case where the reception sensitivity test of the DUT 100 starts, first, the reception sensitivity test control unit 18 in the control unit 11 of the integrated control device 10 sets a test condition (step S1). Specifically, the test condition setting unit 18b sets, for example, each of values of the initial step level SL0, the starting output level OL0, the error tolerance level EL, and the connection drop determination threshold value DT, which are described above, by receiving an operation input in the operation unit 12.

Content set in step S1 assumes an operation of starting first throughput measurement from a state in which the DUT 100 is operated at the starting output level OL0, measuring the throughput at the output level obtained by lowering the fluctuation range by a width of an initial step level from the previous output level from the next output level, and ending the measurement by determining a state in which a step level SL(n) of the test signal becomes equal to or less than the error tolerance level EL in an n-th measurement while repeatedly performing a process of lowering the output level of the test signal (refer to the output level down processes (A) and (B)) in a case where the measured throughput is larger than the threshold value (throughput threshold value) and a process of raising the output level of the test signal (refer to the output level up processes (A) and (B)) in a case where the throughput is equal to or larger than the throughput threshold value.

As the starting output level OL0 and the initial step level SL0, for example, −60 dBm and 20 dB are assumed, respectively. The error tolerance level EL is assumed to be, for example, 1.0 dB. The connection drop determination threshold value DT is assumed to be, for example, −90 dBm.

After the setting of the test condition in step S1 is completed, the reception sensitivity test control unit of the integrated control device 10 increments the number of measurements n by +1 (step S2), and performs a process of setting a parameter related to the N-th measurement and reading a value of the output level OL set in, for example, step S10 (including steps S10a, S10b, and S10c) or step S12 (including steps S12a, S12b, and S12c) therebefore (step S3). Subsequently, the reception sensitivity test control unit 18 performs control to perform the n-th measurement related to the throughput of the DUT 100 while transmitting the test signal based on the parameter, which is set in step S3, related to the measurement (step S4).

As a specific example of the control in steps S3 and S4 (throughput measurement control), the reception sensitivity test control unit 18 sets, as the parameter related to a first measurement, for example, the starting output level OL0 based on the setting of the test condition in step S1, and performs the throughput measurement while driving and controlling the DUT100 at the starting output level OL0.

Next, the reception sensitivity test control unit 18 checks whether or not a step level interval with respect to the throughput measurement of the previous output level related to the current throughput measurement, that is, the step level SL(n) is larger than the error tolerance level EL which is set in step S1 (step S6). In a case where it is determined that the step level SL(n) is larger than the error tolerance level EL (YES in step S6), the reception sensitivity test control unit 18 proceeds to step S7 and continues the throughput measurement and step level search control. As described above, a first throughput measurement is started from the transmission of the test signal at the starting output level OL0, and there is no change width of SL with respect to the measurement of the previous output level, so that the process of step S6 is skipped and the process proceeds to step S7.

In step S7, the reception sensitivity test control unit 18 compares the throughput of the DUT 100, which is measured in step S4, with a throughput threshold value set in advance, and determines whether or not the throughput is equal to or larger than the throughput threshold value. Here, the throughput threshold value is set to 95%, the throughput which is equal to or larger than 95% is set to in a permissible range (PASS), and the throughput which is lower than 95% is set to out of the permissible range (FAIL).

Here, in a case where it is determined that the throughput is equal to or larger than the throughput threshold value ("PASS" state in step S7), the reception sensitivity test control unit 18 executes a process of gradually lowering the output level of the DUT 100 (step S10).

Figure 8A:
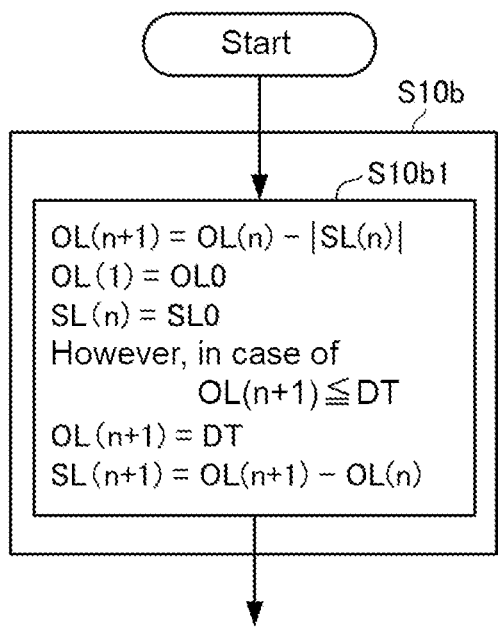
FIGS. 8A and 8B are flowcharts showing details of a level down process of a step level in step S10 of FIG. 7.

In step S10, the reception sensitivity test control unit 18 first determines whether or not before FAIL (step S10a). In a case where it is determined to be before FAIL (YES in step S10a), the reception sensitivity test control unit 18 executes an OL level (output level) down process (A) (step S10b). As shown in FIG. 8A, in the OL level down process (A), a process (step S10b1) of lowering an output level by a step of the initial step level SL0 from a previous OL(OL(n)) is executed on a next output level OL(n+1). As the first output level OL(1), setting is performed so that OL(1)=OL0.

Figure 8B:
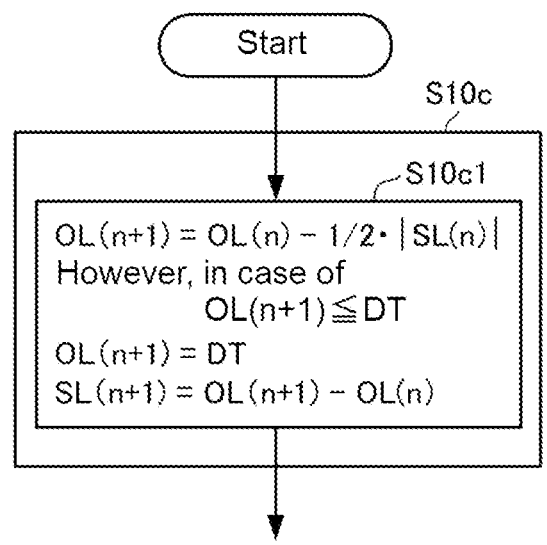

Further, in a case after it is determined to be FAIL in advance (NO in step S10a) in step S10, the reception sensitivity test control unit 18 executes the OL level down process (B) (step S10c). As shown in FIG. 8B, in the OL level down process (B), a process (step S10c1) of lowering the output level by a step (½·SL(n)) which is ½·(half) of the previous step level SL(n) from the previous OL(n) is executed on the output level OL(n+1) used in the next throughput measurement.

In the OL level down process (A) (step S10b) and the OL level down process (B) (step S10c), a process is executed together of determining whether or not to adopt the value in a next step according to the determination result of the connection drop determination threshold value DT.

After step S10b or step S10c, the reception sensitivity test control unit 18 increments the number of measurements n by +1 (step S2), and sets and reads the parameter related to the n-th measurement (step S3). As a result, after step S10b, a step level that is sequentially halved as the number of measurements n increases is set. After step S10c, the throughput measurement is performed n times in order based on the test signal having the output level set in a case where the number of measurements N increases.

On the other hand, in a case where it is determined that the throughput (measurement value) is equal to or less than the throughput threshold value (in a state of "FAIL" in step S7) in step S7, the reception sensitivity test control unit 18 executes a process of raising the output level of the test signal (step S12).

Figure 9A:
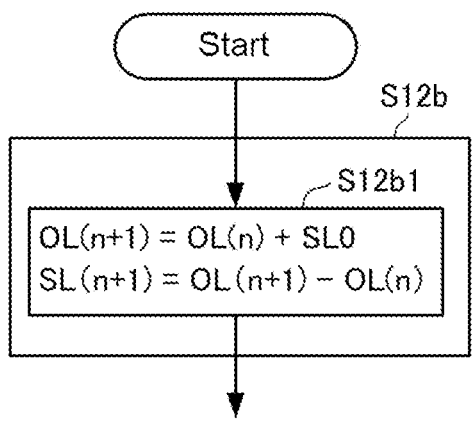
FIGS. 9A and 9B is a flowchart showing details of a level up process of a step level in step S12 of FIG. 7.

In step S12, the reception sensitivity test control unit 18 first determines whether or not the previous output level is also FAIL (step S12a). Here, in a case where it is determined that the previous output level is also FAIL (YES in step S12a), the reception sensitivity test control unit 18 executes the OL level up process (A) (step S12b). As shown in FIG. 9A, in the OL level up process (A), a process (step S12b1) of raising the output level by the step of the step level SL0 is executed on the previous OL(n). For example, in a case where the output level at the start is FAIL, the OL level up process (A) is performed until becoming PASS.

Figure 9B:
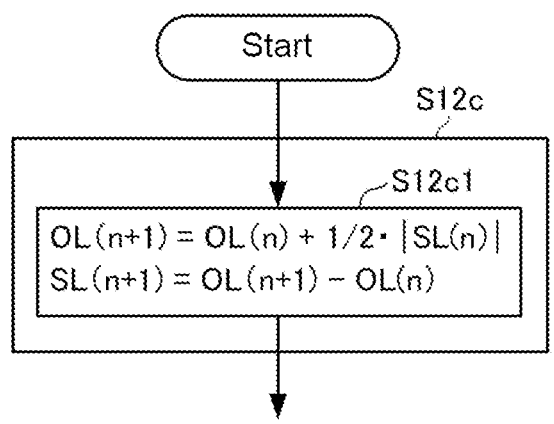

Further, in step S12, in a case where it is determined that the previous output level is not FAIL (NO in step S12a), the reception sensitivity test control unit 18 executes an OL level up process (B) (step S12c). As shown in FIG. 9B, in the OL level up process (B), a process of increasing a value of half the previous step level SL(n) to the previous output level OL(n) is executed (step S12c1).

After step S12b or step S12c is executed, the reception sensitivity test control unit 18 increments the number of measurements n by +1 (step S2), and then sets and reads the parameter related to the n-th measurement (step S3). As a result, after step S12b or step S12c, the throughput measurement is performed n times in order based on the test signal having the output level set in a case where the number of measurements n increases.

After the n-th throughput measurement is executed in step S4, it is checked whether or not the step level SL(n) related to the throughput measurement of the DUT 100 is larger than the error tolerance level EL set in step S1 (step S6). Here, in a case where it is determined that the step level SL(n) is equal to or less than the error tolerance level EL (NO in step S6), the reception sensitivity test control unit 18 stops the throughput measurement and the step level search (step S15), and, thereafter, a series of measurement operations ends. The number of throughput measurements is set to N times in a case where the measurement operation ends, and the lowest value of the output level values determined to be PASS from the first to n-th measurements is displayed on the display unit 13 as the measurement result of the minimum reception sensitivity. Alternatively, a last value of the output level determined to be PASS may be used as reception sensitivity.

Figure 7:
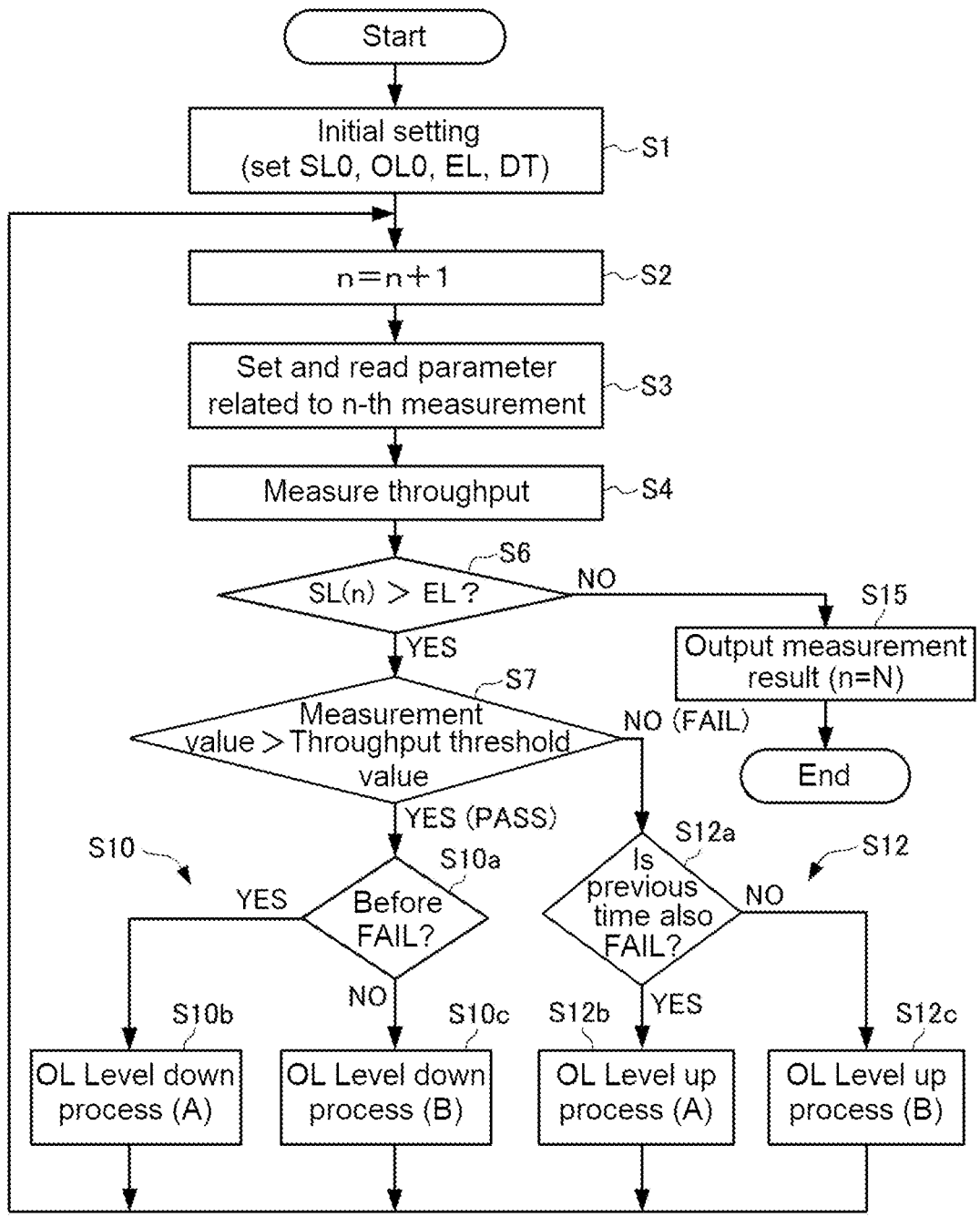
FIG. 7 is a flowchart showing a variable setting control operation of an output level of a test signal according to a reception sensitivity test of the DUT by the measurement device according to the embodiment of the present invention.

According to a series of measurement controls shown in FIG. 7, in a case where the throughput measurement is performed N times with respect to the DUT 100, the step level SL(n) becomes small as the number of measurements increases, and the measurement ends in e case where the step level SL(n) converges to be equal to or less than the error tolerance level EL set in advance. Further, for the fluctuation direction of the output level, the direction changes in one direction toward a lowering direction while the test result of the reception sensitivity test exceeds a predetermined threshold value (throughput threshold value), and the direction changes in both an upward and a downward directions after the test result is lower than the throughput threshold value.

FIG. 10 shows a data example of a parameter related to the output level of a variable test signal, which is set according to the number of measurements by the variable setting control of the output level based on the flowchart shown in FIG. 7 by the measurement device 1 according to the present embodiment. The example of FIG. 10 shows, for example, with respect to each of the total seven measurements, a relationship of the output level of the test signal of each time, the measured throughput, the fluctuation range of the output level between the previous measurement and the current measurement, a type of a process of setting the next output level, and the next output level of the test signal.

Figure 11:
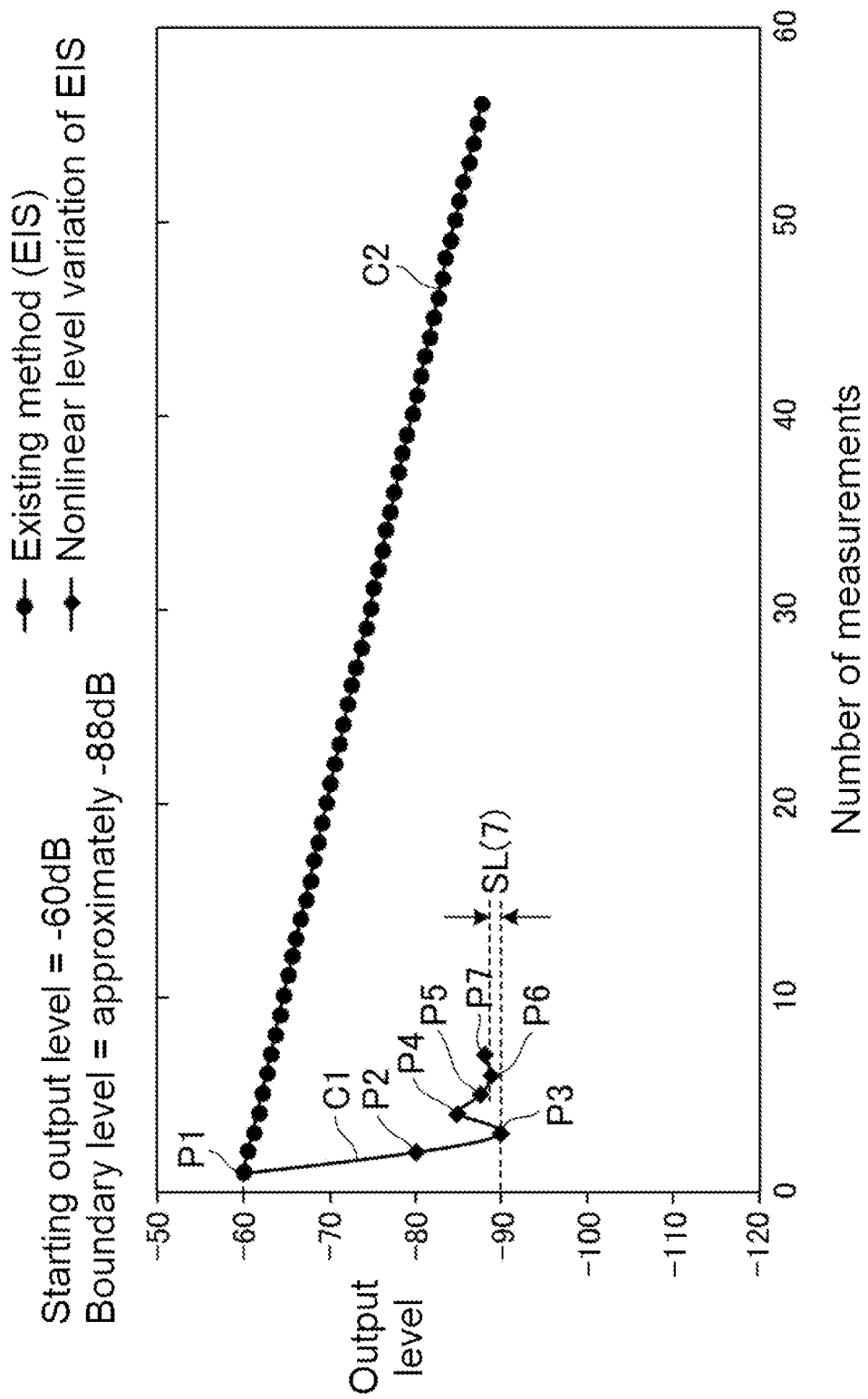
FIG. 11 is a diagram showing characteristics of the output level of the test signal with respect to the number of measurements based on the data example shown in FIG. 10 according to the reception sensitivity test of the DUT in the measurement device according to the embodiment of the present invention.

FIG. 11 is a diagram showing a characteristic C1 of the output level of the test signal with respect to the number of measurements related to the reception sensitivity test of the DUT 100 by the measurement device according to the present embodiment versus. The characteristic C1 is specifically based on the data example shown in FIG. 10. That is, in FIG. 11, the characteristic C1 gives an example in which the throughput measurements (output level variable setting), which are indicated by symbols P1 to P7, are performed a total of seven times and the reception sensitivity test ends. More specifically, in the characteristic Cl, setting is performed such that the initial step level SL0=−20 dB (SL(1)=SL0), the starting output level OL0=−60 dB (OL(1)= OL0), the DT is −90 dB, and the error tolerance level EL=1.0 dB. In the first throughput measurement, the test of the DUT100 starts with the output level OL(1)=−60 dB. Since the throughput measured at this time is higher than the throughput threshold value and is determined to be in the permissible range (PASS), a next second output level OL(2) becomes −80 dB by the level down process (A).

In a second throughput measurement, the throughput value is determined to be PASS with respect to the output level, which is −80 dB, of the DUT100, so that the next output level is set by the level down process (A). Here, a value of −100 dB is calculated, but, in a case where a set value of the output level is equal to or less than a value of the connection drop determination threshold value DT, the value of the connection drop determination threshold value DT is set. Therefore, a next third output level OL(3) becomes −90 dB.

In a third throughput measurement, the throughput value is equal to or less than the throughput threshold value with respect to the output level, which is −90 dB, of the DUT100, so that it is determined to be out of the permissible range (FAIL). Therefore, a next output level is set by the level up process (B). A fluctuation range of 10 dB between the second and third output levels is set to SL(3), and −85 dB obtained by adding 5 dB, which is half the fluctuation range, to the third output level is set as a next fourth output level OL (4).

In the fourth throughput measurement, with respect to the output level, which is −85 dB, of the DUT 100, it is determined to be PASS in which the throughput value is in the permissible range. FAIL is already determined at the third throughput measurement, so that the next output level is set by the level down process (B). A fluctuation range of 5 dB between the third and fourth output levels is set as SL(4), and −87.5 dB obtained by subtracting a value, which is half the fluctuation range, from the fourth output level, is set as a next fifth output level OL(5).

In the fifth throughput measurement, the throughput value is determined to be PASS with respect to the output level of the DUT100 which is −87.5 dB. FAIL is already determined at the third throughput measurement, so that the next output level is set by the level down process (B). A fluctuation range between the fourth and fifth output levels is set as SL(5), and −88.7 dB obtained by subtracting a value, which is half the fluctuation range, from the fifth output level is set as a next sixth output level OL(6).

In the sixth throughput measurement, the throughput value is determined to be FAIL with respect to the output level of the DUT100 which is −88.7 dB. Since the previous fifth throughput measurement is determined to be PASS, the next output level is set by the level up process (B). A fluctuation range between the fifth and sixth output levels is set as SL(6), and −88.1 dB obtained by adding a value, which is half the fluctuation range, to the fifth output level is set as a next seventh output level OL(7).

In a seventh throughput measurement, the throughput value is determined to be FAIL with respect to the output level, which is −88.1 dB, of the DUT100. Here, the fluctuation range from the sixth output level, which is the previous output level, is 0.6 dB, and is determined to be in a range of the error tolerance level EL (=1.0 dB), so that the measurement ends.

FIG. 11 also discloses a characteristic C2 of a test result of a reception sensitivity test, which is performed by linearly fluctuating the output level of the DUT 100 by steps at equivalent intervals, according to the related art. According to the characteristic C2, the reception sensitivity test according to the related art requires 50 steps. On the other hand, in the measurement device 1 according to the present embodiment, as shown in the characteristic C1, it is possible to end the reception sensitivity test of the DUT 100 by only seven steps, so that it is possible to significantly reduce the measurement time.

Further, the characteristic C1 shown in FIG. 11 reflects the following characteristics related to a control operation of the reception sensitivity test of the DUT 100 in the measurement device 1 according to the present embodiment. That is, FIG. 7 shows that, in a case where the output level of the test signal at the start of the reception sensitivity test of the DUT 100 (at the start of transmission and reception of the test signal) is set to OL(1), the output level of the test signal at the end of the seventh transmission and reception is set to OL(7), and a time point, at which the throughput measurement result is lower than the predetermined threshold value and is determined to be FAIL, is set to a third time, the throughput measurement is repeated by repeating the level up process and the level down process while reducing the fluctuation range of the output level of the test signal after the fourth measurement which is next to the time point at which it is determined to be FAIL, and the measurement ends in a case where a fluctuation range SL(7) of the seventh output level is lower than the predetermined threshold value.

Figure 12:
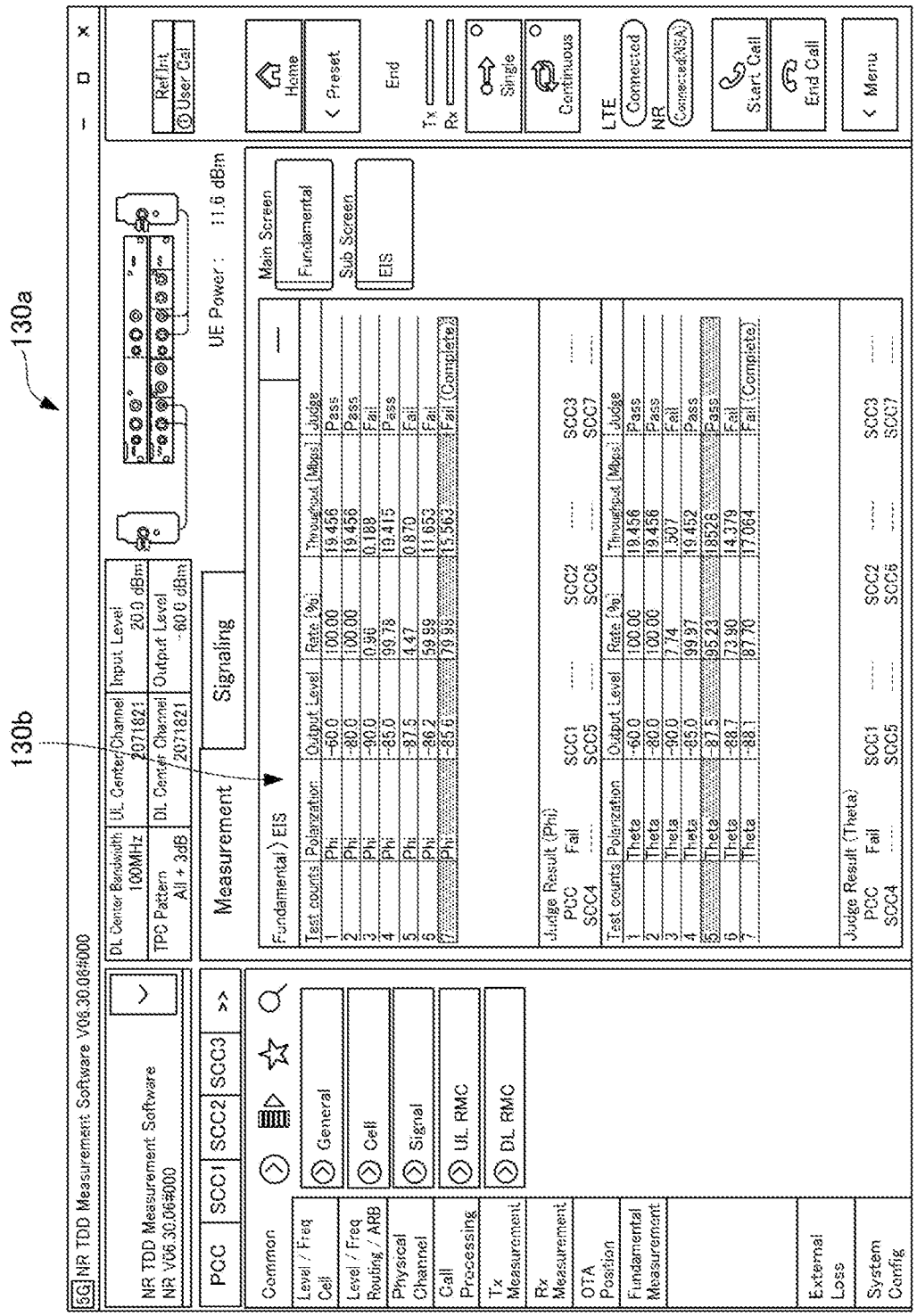
FIG. 12 is a diagram showing a display example of a reception sensitivity test result of the DUT by the integrated control device of the measurement device according to the embodiment of the present invention.

FIG. 12 is a diagram showing a display example of a reception sensitivity test result of the DUT 100 by the measurement device 1 according to the present embodiment. While controlling the reception sensitivity test operation of the DUT 100 according to the flowchart shown in FIG. 7, the display unit 13 of the integrated control device 10 displays, for example, a main screen 130a having a screen configuration shown in FIG. 12. The main screen 130a is provided with a test result display area 130b that displays the measurement result of the throughput (reception sensitivity) of the DUT 100 according to the number of measurements. According to the measurement device 1 according to the present embodiment, in the test result display area 130b on the main screen 130a displayed on the display unit 13, for example, the measurement results of the seven times of throughput measurements shown in FIG. 11 are displayed in a mode of being arranged in chronological order according to the passage of time in a downward direction from an upper part of the figure. Here, for a display mode of the reception sensitivity measurement results of the DUT 100 with respect to the test result display area 130b on the main screen 130a, the throughput measurement results (refer to FIG. 10 and FIG. 11) over seven times accompanied by fluctuation of the step level SL of the characteristic C1 shown in FIG. 7 is displayed.

Figure 13:
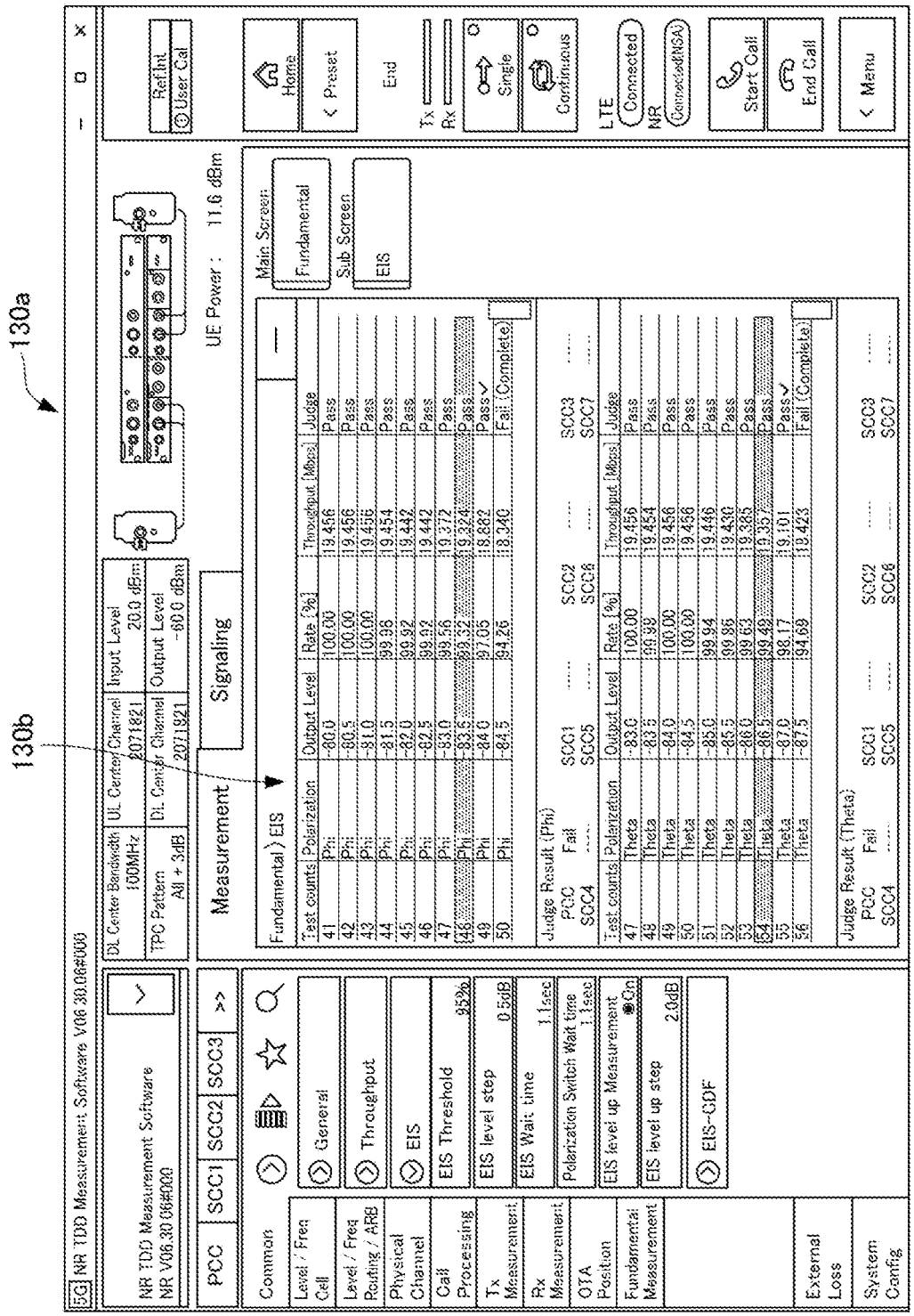
FIG. 13 is a diagram showing a display example of the reception sensitivity test result of the DUT in a device according to the related art.

FIG. 13 shows a display example of the reception sensitivity test results of the DUT 100 in a device according to the related art in order to compare with the display example of the reception sensitivity test results of the DUT 100 by the measurement device 1 according to the present embodiment. As shown in FIG. 13, in the device according to the related art, the test result display area 130b is provided on the main screen 130a displayed on the display unit while controlling the reception sensitivity test operation of the DUT 100, and the test result display area 130b is displayed with 50 times of throughput measurement results accompanied by the linear fluctuation of the step level SL of the characteristic C2 shown in FIG. 11 and arranged in chronological order.

Comparing the display example of the reception sensitivity test results of the DUT 100 in the device according to the related art (refer to FIG. 13) with the display example of the reception sensitivity test results of the DUT 100 by the measurement device 1 according to the present embodiment (refer to FIG. 12), it can be understood that the measurement device 1 according to the present embodiment can integrally display all the small throughput measurement results by using the limited test result display area 130b.

In the above embodiment, the control of the reception sensitivity test operation specialized for the measurement on a single surface (EIS measurement) is illustrated. However, the present embodiment can be applied to a reception sensitivity test related to the measurement on the entire spherical surface (TRP measurement: refer to FIG. 5).

Further, the above embodiment discloses a system configuration example in which the integrated control device 10 is provided outside the measurement device 1. However, the present invention may have a configuration in which the measurement device 1 is provided with a control function of the integrated control device 10.

As described above, the measurement device 1 according to the present embodiment has a configuration including the NR system simulator 20 that generates the test signal, and the reception sensitivity test control unit 18 that executes the reception sensitivity test of measuring (calculating) the reception sensitivity of a certain DUT 100 which is the device under test by repeating transmission and reception of the test signal from the NR system simulator 20 to the device under test, thereby testing the DUT 100.

The reception sensitivity test control unit 18 has a configuration including a test condition setting unit 18b that sets a fluctuation range (error tolerance level EL) of an output level of a predetermined test signal in order to determine whether or not to perform the transmission and reception next time, a throughput measurement unit 18c that measures a throughput related to reception capacity of the DUT 100 for each transmission and reception, an output level variable setting unit 18d that sets the output level of the test signal to be different from a previous output level according to a comparison result between a measurement result of the throughput and a predetermined threshold value set in advance, and measurement result output unit 18e that continues the transmission and reception in a case where a fluctuation range from the previous output level exceeds a range of the error tolerance level EL set by the test condition setting unit 18b, and outputs a test result in a case where the fluctuation range from the previous output level is in a range of the error tolerance level EL.

With the configuration, in the measurement device 1 according to the present embodiment, the output level of the test signal is set to be different from the previous output level by causing the output level of the test signal to be down or up according to the measurement result of the throughput, so that it is possible to significantly reduce the number of executions of the transmission and reception compared to a case where the output level of the test signal is linearly changed, it is possible to set the output level of the test signal to a target level in a short time, and it is possible to efficiently execute a reception sensitivity test of the mobile terminal.

Further, in the measurement device 1 according to the present embodiment, the output level variable setting unit 18d sets a signal level of the test signal at the start of transmission and reception to OL(1), sets the signal level of the test signal to OL(N) at the end of the N-th transmission and reception, and performs a level up process while reducing the fluctuation range of the output level of the test signal after a time point at which the measurement result of the throughput is lower than the predetermined threshold value and is determined to be FAIL.

With the configuration, the measurement device 1 according to the present embodiment performs a process of lowering the output level until the time point at which the measurement result of the throughput is lower than the predetermined threshold value and is determined to be FAIL, and then performs a process of raising the output level. In a case of raising the output level, control is performed so that the output level to be smaller than that of the previous output level, so that it is possible to more effectively reduce reception sensitivity test time of the DUT 100. In addition, in a case where the measurement result of the throughput is in the predetermined threshold value range and PASS is determined, a process of lowering the output level is performed, and thereafter a control is performed to reduce the fluctuation range of the output level, so that further efficiency can be achieved.

Further, the measurement device 1 according to the present embodiment has a configuration further including an OTA chamber 50 having an internal space 51, and a DUT scanning mechanism 56 that drives and scans the DUT 100 so as to continuously change an orientation of the DUT 100 in the internal space 51, in which the reception sensitivity test is performed in all orientations to be scanned by the DUT scanning mechanism 56 in an OTA measurement environment in the internal space 51.

With the configuration, in the measurement device 1 according to the present embodiment, it is possible to significantly reduce the time for the reception sensitivity test even under a situation in which reception sensitivity measurement should be performed for all orientations in under the OTA environment.

Further, a mobile terminal testing method applied to a measurement device 1 according to the present embodiment is a mobile terminal testing method for testing (reception sensitivity test) the DUT 100 which is a device under test by executing a test of calculating reception sensitivity by repeating transmission and reception of a test signal from an NR system simulator 20 to the device under test, the mobile terminal testing method including a test condition setting step (S1) of setting a fluctuation range (error tolerance level EL) of an output level of a predetermined test signal in order to determine whether or not to perform the transmission and reception next time, a throughput measurement step (S4) of measuring a throughput related to reception capacity of the DUT 100 for each transmission and reception; an output level setting step (S7, S10, S12) of setting the output level of the test signal to be different from a previous output level according to a comparison result between a measurement result of the throughput and a predetermined threshold value set in advance; a test continuation step (S6, S7) of continuing the transmission and reception in a case where a fluctuation range from the previous output level exceeds the error tolerance level EL set by the test condition setting step; and a measurement result output step (S6, S15) of outputting a test result in a case where the fluctuation range from the previous output level is in a range of the error tolerance level EL.

With the configuration, in the mobile terminal testing method according to the present embodiment, the output level of the test signal is set to be different from the previous output level by causing the output level of the test signal to be down or up according to the measurement result of the throughput, so that it is possible to significantly reduce the number of executions of the transmission and reception compared to a case where the output level of the test signal is linearly changed, it is possible to set the output level of the test signal to a target level in a short time, and it is possible to efficiently execute a reception sensitivity test of the DUT100.

INDUSTRIAL APPLICABILITY

As described above, the mobile terminal testing device and the mobile terminal testing method according to the present invention have advantages in that it is possible to set an output level of a test signal to a testable level in a short time and it is possible to efficiently perform a reception sensitivity test of the mobile terminal, and are useful for all the mobile terminal testing device and the measuring method for performing a reception sensitivity test of a mobile terminal, such as a 5G wireless terminal, having high-speed communication capability.

DESCRIPTION OF REFERENCE NUMERALS AND SIGNS

1: measurement device (mobile terminal testing device)
5: Test antenna
10: Integrated control device
16: DUT scanning control unit (scanning means)
18: Reception sensitivity test control unit (reception sensitivity test execution means)
18b: Test condition setting unit (test condition setting means)
18c: Throughput measurement unit (throughput measurement means)
18d: Output level variable setting unit (output level setting means)
18e: Measurement result output unit (measurement result output means)
20: NR system simulator (signal generator)
50: OTA chamber (radio anechoic box)
51: Internal space
56: DUT scanning mechanism (biaxial positioner or scanning means)
100: DUT (Device Under Test, mobile terminal)

What is claimed is:

1. A mobile terminal testing device for testing a mobile terminal, which is a device under test, comprising:
   a signal generator that generates a test signal; and
   reception sensitivity test execution means for executing a test of calculating reception sensitivity by repeating transmission and reception of the test signal from the signal generator to the device under test, wherein
   the reception sensitivity test execution means includes
   test condition setting means for setting a predetermined error tolerance level (EL),
   throughput measurement means for measuring a throughput related to reception capacity of the mobile terminal for each transmission and reception,
   output level setting means for setting an output level of the test signal to be different from a previous output level according to a comparison result between a measurement result of the throughput and a predetermined threshold value set in advance, and
   measurement result output means for continuing the transmission and reception in a case where a fluctuation range with respect to the previous output level exceeds the error tolerance level, and outputting a test result in a case where the fluctuation range with respect to the previous output level is in a range of the error tolerance level.

2. The mobile terminal testing device according to claim 1, wherein
   in a case where the comparison result between the measurement result of the throughput and the predetermined threshold value set in advance becomes out of a permissible range for the first time,
   the output level setting means sets the output level to a higher value than the previous output level by performing a level up process, so that the fluctuation range with respect to the previous output level is smaller than a value of any of fluctuation ranges of the output level in a case where the measurement result of the throughput is in a permissible range.

3. The mobile terminal testing device according to claim 2, wherein
   in a case where the comparison result between the measurement result of the throughput and the predetermined threshold value set in advance becomes in the permissible range again,
   the output level setting means reduces the output level by a level down process, so that the fluctuation range with respect to the previous output level is smaller than a value of the fluctuation range in a case where the comparison result between the measurement result of the throughput and the predetermined threshold value set in advance is out of the permissible range.

4. The mobile terminal testing device according to claim 3, further comprising:
   a radio anechoic box including an internal space; and
   scanning means for driving and scanning the mobile terminal so as to continuously change an orientation of the mobile terminal in the internal space, wherein
   the reception sensitivity test is performed in all orientations to be scanned by the scanning means in an over the air (OTA) measurement environment in the internal space.

5. The mobile terminal testing device according to claim 2, further comprising:
   a radio anechoic box including an internal space; and
   scanning means for driving and scanning the mobile terminal so as to continuously change an orientation of the mobile terminal in the internal space, wherein
   the reception sensitivity test is performed in all orientations to be scanned by the scanning means in an over the air (OTA) measurement environment in the internal space.

6. The mobile terminal testing device according to claim 1, further comprising:
   a radio anechoic box including an internal space; and
   scanning means for driving and scanning the mobile terminal so as to continuously change an orientation of the mobile terminal in the internal space, wherein
   the reception sensitivity test is performed in all orientations to be scanned by the scanning means in an over the air (OTA) measurement environment in the internal space.

7. A mobile terminal testing method for testing a mobile terminal which is a device under test by executing a test of calculating reception sensitivity by repeating transmission and reception of a test signal from a signal generator to the device under test, the mobile terminal testing method comprising:
   a test condition setting step of setting a predetermined error tolerance level (EL);
   a throughput measurement step of measuring a throughput related to reception capacity of the mobile terminal for each transmission and reception;
   an output level setting step of setting an output level of the test signal to be different from a previous output level according to a comparison result between a measurement result of the throughput and a predetermined threshold value set in advance;
   a test continuation step of continuing the transmission and reception in a case where a fluctuation range with respect to the previous output level exceeds the error tolerance level set by the test condition setting step; and
   a measurement result output step of outputting a test result in a case where the fluctuation range of the output level with respect to the previous output level is in a range of the error tolerance level.

* * * * *